United States Patent
List

(10) Patent No.: US 8,096,115 B2
(45) Date of Patent: Jan. 17, 2012

(54) PUMP DRIVE OF AN AUTOMATIC TRANSMISSION

(75) Inventor: Matthias List, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 598 days.

(21) Appl. No.: 12/307,161

(22) PCT Filed: Jun. 29, 2007

(86) PCT No.: PCT/EP2007/056539
§ 371 (c)(1),
(2), (4) Date: Dec. 31, 2008

(87) PCT Pub. No.: WO2008/015060
PCT Pub. Date: Feb. 7, 2008

(65) Prior Publication Data
US 2009/0286641 A1    Nov. 19, 2009

(30) Foreign Application Priority Data
Jul. 29, 2006  (DE) .......................... 10 2006 035 133

(51) Int. Cl.
*F16H 57/04*  (2010.01)
*F16H 41/24*  (2006.01)

(52) U.S. Cl. .......................................... 60/358
(58) Field of Classification Search ............ 60/330, 60/358
See application file for complete search history.

(56) References Cited

U.S. PATENT DOCUMENTS

| | | | |
|---|---|---|---|
| 2,821,095 A | 1/1958 | Kelley | |
| 4,252,031 A | 2/1981 | Nishimura et al. | |
| 4,305,487 A * | 12/1981 | Sunohara | 192/3.28 |
| 5,352,100 A | 10/1994 | Bauknecht et al. | |
| 5,400,884 A * | 3/1995 | Matsuoka | 60/358 |
| 5,833,445 A | 11/1998 | Van Spijk | |
| 6,196,551 B1 * | 3/2001 | Zellers | 60/330 |

FOREIGN PATENT DOCUMENTS

| | | |
|---|---|---|
| DE | 198 59 761 A1 | 6/2000 |
| EP | 1 598 576 A1 | 11/2005 |
| FR | 2 400 646 | 3/1979 |
| JP | 04-157248 | 5/1992 |
| JP | 2006-064009 | 3/2006 |
| WO | WO-92/07204 | 4/1992 |

* cited by examiner

*Primary Examiner* — Thomas E Lazo
(74) *Attorney, Agent, or Firm* — Davis & Bujold, P.L.L.C.

(57) ABSTRACT

A pump drive of an automatic transmission with a hydrodynamic torque converter driven by a drive motor and with an oil pump driven by a pump wheel of the torque converter. The pump wheel of the torque converter is connected to a converter hub that extends from the pump wheel in the direction opposite the drive motor and is mounted radially by way of a converter hub bearing in or on a wall of the automatic transmission fixed with respect to the transmission housing and radially encloses a section of a pump drive shaft of the oil pump. The pump drive shaft is radially centered in the converter hub and, on its side facing toward the drive motor, is connected to the converter hub by a driving profile.

12 Claims, 2 Drawing Sheets

PUMP DRIVE OF AN AUTOMATIC TRANSMISSION

This application is a national stage completion of PCT/EP2007/056539 filed Jun. 29, 2007, which claims priority from German Application Serial No. 10 2006 035 133.9 filed Jul. 29, 2006.

FIELD OF THE INVENTION

The invention concerns a pump drive of an automatic transmission with a hydrodynamic torque converter driven by a drive motor and an oil pump driven by a pump wheel of the torque converter.

BACKGROUND OF THE INVENTION

As is known, automatic transmissions need an oil pump for delivering pressure and lubricating medium for the supply of hydraulically actuated frictional shift elements and for the lubrication of the transmission's gear teeth and bearings. From EP 1 598 576 A1 an automatic transmission is known, whose transmission input shaft is connected via a hydrodynamic torque converter to a drive motor and whose oil pump is driven by a pump wheel of the torque converter connected to a crankshaft of the drive motor. This oil pump is arranged with its axis parallel to the transmission input shaft and to the torque converter and a chain drive being provided for driving the oil pump. In this case, it is provided that the pump wheel of the torque converter is connected to a crankshaft of the drive motor, a turbine wheel of the torque converter is connected to the transmission input shaft, and the pump wheel has a hub, usually called the "converter neck", which is mounted radially, via a slide bearing, on a hub fixed onto the transmission housing and usually called the "guide-wheel spindle". The guide-wheel spindle also is positively connected to a guide-wheel of the torque converter. The chain drive for driving the oil pump has a driven chain wheel which is positively connected, via a driving finger of the converter socket, to the torque converter, a follower chain wheel connected rotationally fixed to a pump drive shaft, and a chain that transmits the rotation of the driven chain wheel is arranged on the side of the torque converter remote from the drive motor in the area of an outer wall of the transmission housing on the converter side, and mounted radially via a slide bearing—such as the converter neck of the torque converter—on the guide-wheel spindle of the transmission fixed on the transmission housing. The axial mounting of the driven chain wheel is ensured by check-rings positioned on both sides of the driven chain wheel.

The purpose of the present invention is to provide a pump drive of an automatic transmission with a hydrodynamic torque converter and an oil pump driven by a pump wheel of the torque converter, whose connection on the torque side to the torque converter is optimized in terms of cost and ease of assembly.

SUMMARY OF THE INVENTION

Accordingly, a pump drive of an automatic transmission with a hydrodynamic torque converter driven by a drive motor and an oil pump driven by a pump wheel of the torque converter is proposed, in which the pump wheel of the torque converter is connected to a converter hub that extends starting from the pump wheel of the torque converter axially in the direction away from the drive motor, being mounted radially via a converter hub bearing in or on a wall fixed to the transmission housing and radially enclosing a section of a pump drive shaft of the oil pump, such that the said pump drive shaft is centered radially in the said converter hub and such that the pump drive shaft, on its side facing toward the drive motor, is positively connected to the converter hub by way of a driving profile. The "side of the pump drive shaft facing toward the drive motor" can also be said to be, or regarded as, "the side of the pump drive shaft remote from the transmission".

Viewed spatially, the said centering mechanisms of the pump drive shaft can be arranged on the side of the driving profile of the pump drive shaft remote from the drive motor. Viewed spatially, the centering mechanisms of the pump drive shaft can also be arranged on the side of the driving profile of the pump drive shaft facing toward the drive motor. However, it can also be provided that by way of its driving profile the pump drive shaft is centered radially in the converter hub of the torque converter, i.e., the driving profile of the pump drive shaft at the same time ensures or forms the radial centering mechanisms of the pump drive shaft in the converter hub.

Preferably, this pump drive is provided for or combined with an oil pump which is not arranged co-axially to the torque converter—i.e., it is axially parallel or at an angle thereto. In this case, the oil pump of the automatic transmission can be connected with the pump wheel of the torque converter for example by a chain drive, a spur drive or a bevel drive, and the pump drive shaft. The drive shaft is then connected to a driven chain wheel of the chain drive or to a driven spur gear of the spur drive or to a driven bevel gear of the bevel drive and a follower chain wheel of the chain drive or a follower spur gear of the spur drive or a follower bevel gear of the bevel drive is connected to a pump input shaft or to a pump wheel of the oil pump. In a version that is convenient from the standpoint of production technique, it is proposed that the pump drive shaft and the driven chain wheel, spur gear or bevel gear are made as one, integral piece.

However, the pump drive can also be provided for or combined with an oil pump arranged co-axially with the torque converter. In that case, the pump drive shaft is connected directly to a pump wheel of the oil pump of the automatic transmission. In a version of this that is convenient from the production technique standpoint, it is proposed that the pump drive shaft and the pump wheel of the oil pump are made integrally.

Regarding its connection to the torque converter on the torque side, the pump drive of the transmission oil pump is very inexpensive. The driving profile provided for the positive connection between the pump drive shaft and the converter pump wheel or converter hub can be made without machining and is substantially cheaper than a finger drive on the side of the pump drive shaft opposite to the drive motor as in the type-defining prior art of EP 1 598 576 A1. A further advantage of the connection of the transmission oil pump's drive to the torque converter on the torque side in accordance with the invention is its mechanical robustness during the assembly of the torque converter to the transmission input shaft and to the pump drive shaft. A further substantial cost advantage of the transmission oil pump drive compared with the type-defining prior art of EP 1 598 576 A1, results from the elimination of the necessary separate slide or roller bearing radially between the pump drive shaft and the guide-wheel spindle. Furthermore, the smaller tolerance chain between the converter pump and the driven chain wheel of the transmission oil pump drive, reduced by one component tolerance compared with the type-defining prior art of EP 1 598 576 A1, has a positive effect on the acoustics during the operation of the automatic transmission. In addition, the design provided by the invention, of the radial bearing between the wall fixed to the transmission housing and the converter hub with a radial bearing surrounding the converter hub, enables comparatively simple oil channelling in the radial gap between the hub on the housing or guide-wheel spindle and the converter hub.

A further advantage of the mounting of the pump drive shaft is obtained especially in connection with a transmission oil pump arranged axis-parallel to the torque converter or axis-parallel to the pump drive shaft, whose pump input shaft is in active connection, via a chain drive or spur drive, with the pump drive shaft. The driven chain wheel or spur gear of the chain drive or spur drive, connected fixed to the pump drive shaft, cannot tilt very much because of the comparatively long length of the pump drive shaft—i.e., because of the comparatively broad bearing base of the driven chain wheel or spur gear, so that the driven chain wheel or spur gear can withstand the radial forces of the chain or spur drive effectively and the system is comparatively insensitive to wear.

If the pump drive of the transmission oil pump is combined with a transmission oil pump arranged co-axially with the torque converter and co-axially with the pump drive shaft, then the design of the connection to the torque converter on the torque side, makes it possible for this combination to have a converter hub of advantageously short diameter.

Let it be said that the structure of the oil pump per se can be of any type, as desired. For example, a transmission oil pump, arranged non-co-axially with the torque converter or non-co-axially with the pump drive shaft, can be made as a compact cell pump. As an example embodiment of a transmission oil pump, arranged co-axially to the torque converter or co-axially with the pump drive shaft, an annular gear pump may be mentioned. Let it also be said that an automatic transmission of any desired structure can be used. For example, the automatic transmission can be an automatically shifted variable-speed transmission or a continuously variable transmission. The design of the hydrodynamic torque converter per se can also be as desired, and it could be made as a Trilok converter with a driven pump wheel and a driving turbine wheel and torque-supporting guide wheel, but also as a simpler, Föttinger converter with a driven pump wheel and a driving turbine wheel, without a guide wheel.

Regardless of whether the oil pump of the automatic transmission is arranged non-co-axially or co-axially with the torque converter, a further feature of the invention proposes that the pump drive shaft is statically sealed relative to the converter hub by way of a sealing ring. In this case, viewed in the radial direction the statically sealing ring is arranged between the pump drive shaft and the converter hub and viewed in the axial direction, it is arranged on the side of the driving profile of the pump drive shaft remote from the drive motor. In combination with an oil pump, arranged non-co-axially with the pump drive shaft and a centering system for the pump drive shaft, arranged axially between the driving profile of the pump drive shaft and the driven chain wheel or spur or bevel gear connected to the pump drive shaft, the sealing ring provided for static sealing between the pump drive shaft and the converter hub, viewed spatially, can be positioned axially between the driving profile and the centering system of the pump drive shaft; in this case, preferably set into a radial groove of the pump drive shaft.

As a further feature of the invention, it is proposed that the pump drive shaft is rotationally sealed by way of a further sealing ring relative to a housing hub fixed to the transmission housing, which is in positive or active connection with a guide wheel of the torque converter and is, therefore, usually also known as a guide-wheel spindle. In this case, viewed in the radial direction the rotationally sealing ring is arranged between the pump drive shaft and the housing hub and, viewed in the axial direction, on the side of the pump drive shaft remote from the drive motor. In combination with an oil pump arranged non-co-axially with the pump drive shaft and a pump drive shaft made as a driven chain wheel or spur or bevel gear of the oil pump drive, the sealing ring, viewed spatially, can be arranged in the area central with respect to the teeth of the driven chain wheel or spur or bevel gear.

Yet another feature of the invention, it is proposed that the converter hub is rotationally sealed relative to the wall fixed to the transmission housing by a further sealing ring. This rotationally sealing ring, viewed in the radial direction, is arranged between the converter hub and the inside diameter of a bore in the wall fixed on the transmission housing and, viewed axially, on the side of the converter hub bearing facing toward the drive motor or remote from the transmission or facing toward the driving profile of the pump drive shaft.

BRIEF DESCRIPTION OF THE DRAWINGS

The invention will now be described, by way of example, with reference to the accompanying drawings in which.

DETAILED DESCRIPTION OF THE INVENTION

Figure 1:
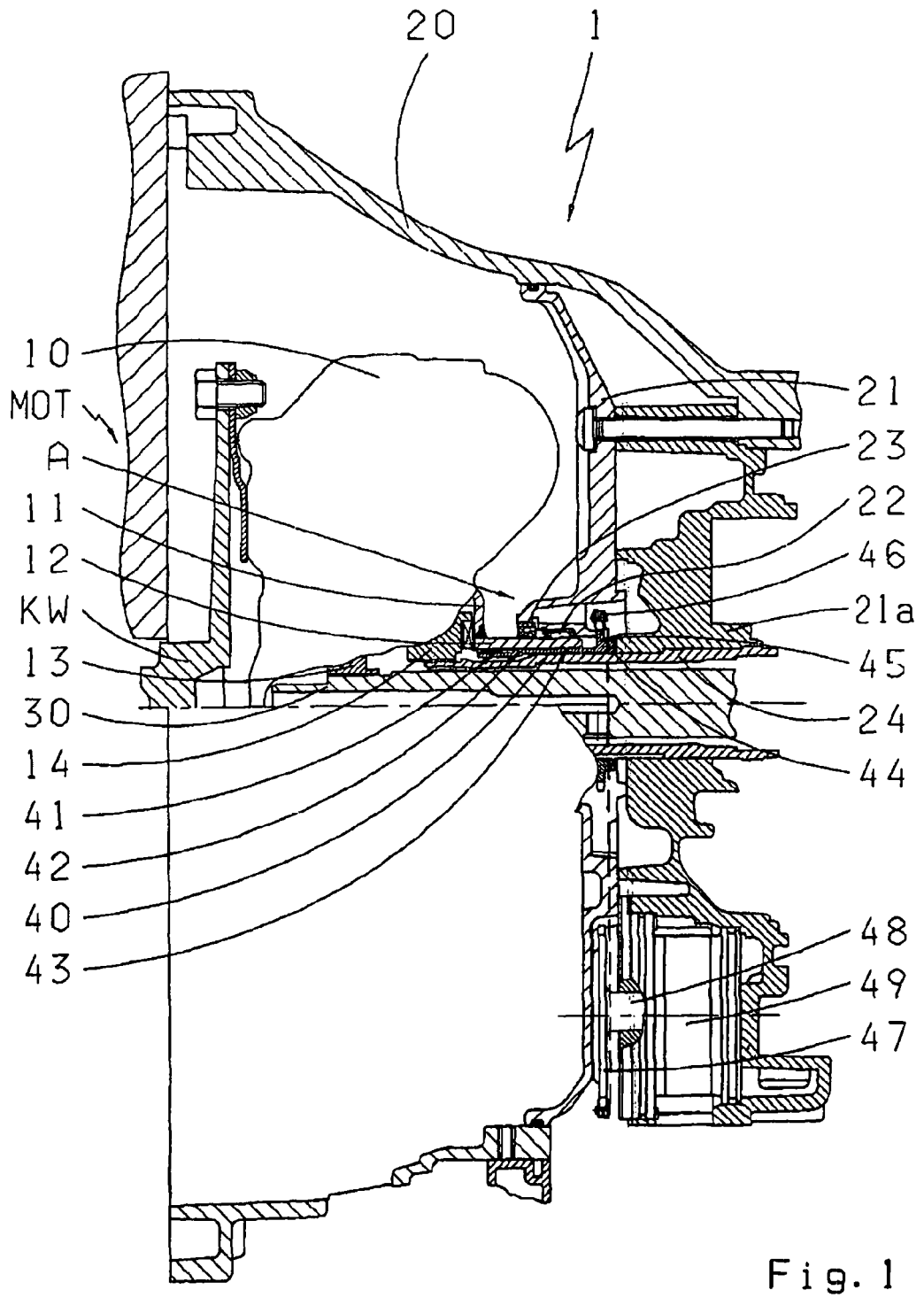
FIG. 1 is a simplified sectional view of an automatic transmission with an example of a pump drive according to the invention.
Figure 2:
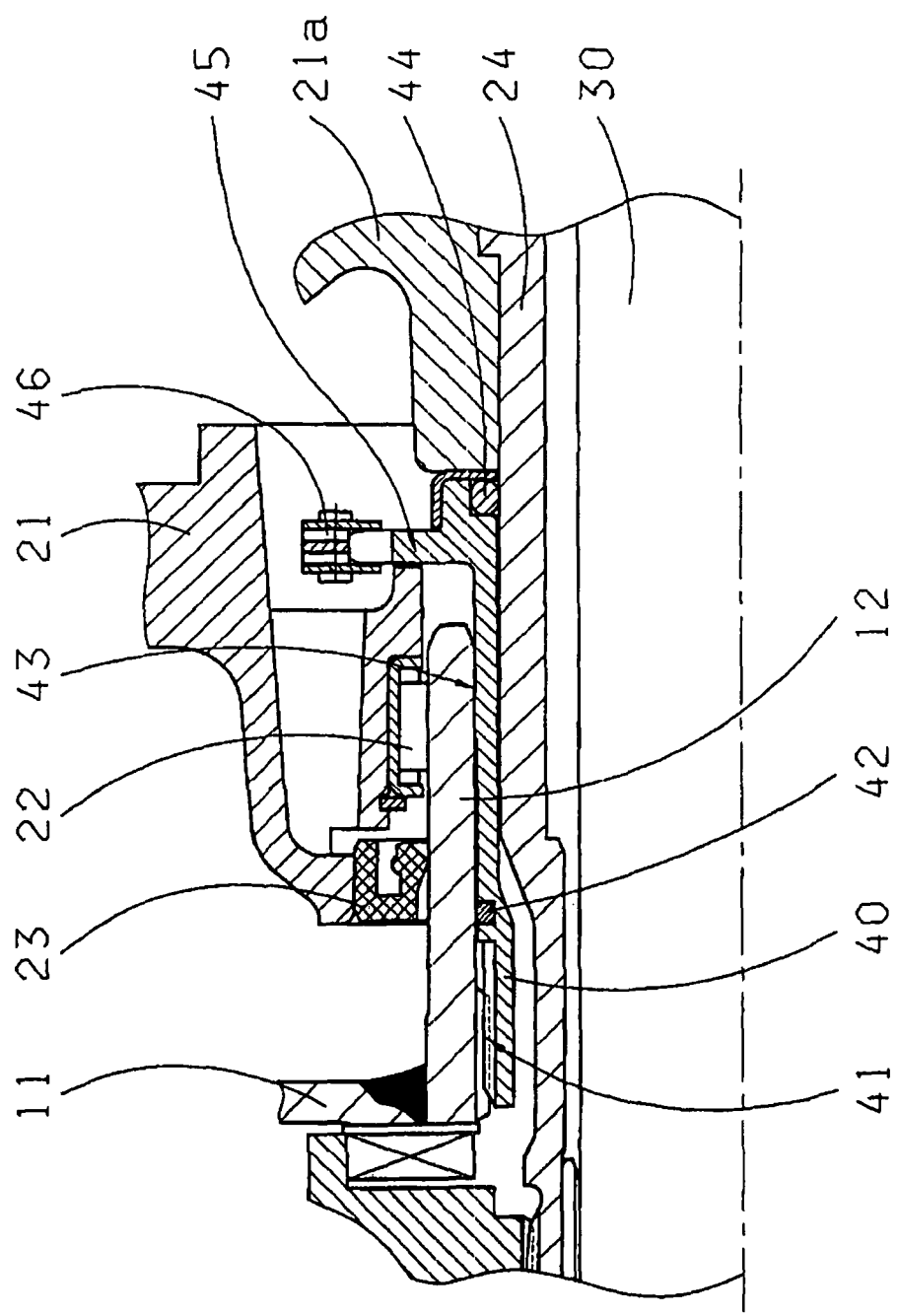
FIG. 2 is a section (detail A) from FIG. 1 shown on a larger scale.

The example embodiments, illustrated in FIGS. 1 and 2, are a pump drive of an automatic transmission 1 with a hydrodynamic torque converter 10 driven by a drive motor MOT and an oil pump 49 driven by a pump wheel 11 of the torque converter 10, which is arranged axis-parallel to the torque converter 10 for a design variation of a pump drive according to the invention.

A transmission housing of the automatic transmission 1 is indexed 20 and a transmission input shaft of the automatic transmission 1 is indexed 30. The torque converter 10 is made as a Trilok converter and is arranged inside a section of the transmission housing 20 which faces toward the drive motor MOT of the automatic transmission 1 and is open toward the motor MOT. Together with a converter housing, the pump wheel 11 of the torque converter 10 forms a unit and is connected to a crankshaft KW of the drive motor MOT. The drive motor MOT itself is represented in FIG. 1 only in simplified form. In a known way, the pump wheel 11 of the torque converter 10 transmits the torque and speed of the drive motor MOT hydrodynamically to a turbine wheel 13 of the torque converter 10 using a torque-supporting guide wheel 14 of the torque converter 10. In turn, the turbine wheel 13 is connected to the transmission input shaft 30. On the side of the torque converter 10, facing away from the drive motor MOT, is arranged a wall of the automatic transmission 1 fixed with respect to the transmission housing and consisting of a cover 21 and an intermediate plate 21a, through which the transmission input shaft 30 passes centrally and which forms an outer wall of the transmission housing 20 on the drive motor side. The intermediate plate 21a, fixed to the transmission housing, is connected in a rotationally fixed manner to a housing hub 24, which extends axially from the housing wall 21, 21a in the direction of the torque converter 10, enclosing a section of the transmission input shaft 30 and being positively or actively connected to the guide wheel 14 of the torque converter 10. Correspondingly, this housing hub 24 can also be called a guide wheel spindle and, in contrast to FIG. 1, can be made as part of the wall or intermediate plate 21a fixed to the transmission housing 20.

The torque converter 10 is radially mounted in the wall 21, 21a, fixed to the transmission housing 20. For this, the torque converter 10 comprises a converter hub 12 in fixed connection with the pump wheel 11 of the torque converter 10 and extending from the pump wheel 11 axially in the direction of the wall 21, 21a fixed with respect to the transmission housing 20 as far as into a central bore of the cover 21 fixed to the transmission housing, in which the converter hub 12 is held by a converter hub bearing 22, in this case, made as a needle bearing. In another design variation, the converter hub bearing 22 could be made as a slide bearing.

Furthermore, to seal the inside space of the transmission from the outside, it is provided that relative to the cover 21a fixed with respect to the transmission housing, the converter hub 12 is rotationally sealed by a sealing ring 23 which, here is made as a radial shaft sealing ring which, viewed in the radial direction, is positioned between the converter hub 12 and the inside diameter of a bore of the cover 21 fixed to the transmission housing, and viewed in the axial direction, is on the side of the converter hub bearing 22 that faces away from the transmission or toward the turbine wheel 13 of the torque converter 10 and the drive motor MOT.

The oil pump 49 of the automatic transmission 1, designed as an off-axis pump, is represented in FIG. 1 only in simplified form. The pump drive of the oil pump 49 comprises a pump drive shaft 40 connected to the pump wheel 11 of the torque converter 10, and a pump input shaft 48 connected on one side with a pump wheel of the oil pump 49 and on the other side, via a chain drive, to the pump drive shaft 40. A driven chain wheel 45 of this chain drive and the pump drive shaft 40 are in this case made integrally. Viewed spatially, the pump drive shaft 40 extends from the driven chain wheel 45 axially toward the pump wheel 11 or the converter housing of the torque converter 10, for the most part radially inside the converter hub 12 and axially in the area of the weld joint between the converter hub 12 and the pump wheel 11. Thus, the pump drive shaft 40 encloses an axial section of the housing hub or guide wheel spindle 24. In a design that deviates from this, the pump drive shaft 40 and the driven chain wheel 45 can be made as separate components, which are then connected together by a suitable positive-lock or friction-force-lock or fusion-welded joint. A follower chain wheel 47 of the chain drive is connected to the pump input shaft 48. A chain 46 is provided to form the active connection between the driven chain wheel 45 and the follower chain wheel 47. In a known way, the rotation speed of the pump input shaft 48 is determined by the speed of the pump drive shaft 40 and the transmission ratio of the chain drive, i.e., the ratio between the numbers of teeth on the follower and the driven chain wheels 47, 45.

As can also be seen in FIGS. 1 and 2, the connection between the pump drive shaft 40 and the pump wheel 11 of the torque converter 10 is a positive-lock connection. For this, in the area of its end opposite to the driven chain wheel 45, the pump drive shaft 40 has a driving profile 41, which engages positively in a corresponding driving profile of the converter hub 12. In an area axially between this driving profile 41 and the driven chain wheel 45, the pump drive shaft 40 has a section in which the pump drive shaft 40 is radially centered in the converter hub 12 by centering mechanisms 43.

As can further be seen in FIGS. 1 and 2, the pump drive shaft 40 is statically sealed, relative to the converter hub 12, by way of a sealing ring 42 which, viewed in the radial direction, is arranged between the pump drive shaft 40 and the converter hub 12 and, viewed in the axial direction, is positioned between the centering mechanisms 43 and the driving profile 41 of the pump drive shaft 40. The type and structure of this statically sealing ring 42 can be as desired. In the example embodiment illustrated, the sealing ring 42 is made as an ordinary O-ring, for example set into a radial groove of the pump drive shaft 40.

Furthermore, the pump drive shaft 40 is rotationally sealed, relative to the fixed housing hub or guide wheel spindle 24, by a sealing ring 44 which, viewed in the radial direction, is arranged between the pump drive shaft 40 and the housing hub 24 and, viewed in the axial direction, is arranged on the side of the centering mechanisms 43 of the pump drive shaft 40 facing away from the driving profile 41 of the pump drive shaft 40, here in an area close to the driven chain wheel 45. The type and structure of this rotationally sealing ring 44 can be as desired. In the example embodiment illustrated, the sealing ring 44 is an ordinary rectangular ring set into a radial groove of the drive shaft 40 of the pump.

REFERENCE NUMERALS 1 automatic transmission
10 torque converter
11 pump wheel of the torque converter
12 converter hub
13 turbine wheel of the torque converter
14 guide wheel of the torque converter
20 transmission housing
21 wall, cover
21a wall, intermediate plate fixed with respect to the transmission housing
22 converter hub bearing
23 rotationally sealing ring
24 housing hub, guide wheel spindle
30 transmission input shaft
40 pump drive shaft
41 driving profile of the pump drive shaft
42 statically sealing ring
43 centering mechanisms of the pump drive shaft
44 rotationally sealing ring
45 driven chain wheel
46 chain
47 follower chain wheel
48 pump input shaft
49 oil pump of the automatic transmission
MOT drive motor
KW crankshaft of the drive motor
A detail of FIG. 2

The invention claimed is:

1. A pump drive of an automatic transmission (1) with a hydrodynamic torque converter (10) driven by a drive motor (MOT) and an oil pump (49) driven by a pump wheel (11) of the torque converter (10), the pump wheel (11) of the torque converter (10) being connected to a converter hub (12) that extends from the pump wheel (11) of the torque converter (10) in the direction opposite the drive motor (MOT), the converter hub (12) is radially supported by a converter hub bearing (22) in or on a wall (21, 21a) of the automatic transmission (1) fixed with respect to a transmission housing, and radially encloses a section of a pump drive shaft (40) of the oil pump (49), the pump drive shaft (40) is radially centered in the converter hub (12) and on a side facing toward the drive motor (MOT), being connected by positive interlock to the converter hub (12) by a driving profile (41).

2. The pump drive according to claim 1, wherein centering mechanisms (43) are provided for the pump drive shaft (40)

which, viewed spatially, are arranged on a side of the driving profile (41) of the pump drive shaft (40) facing away from the drive motor (MOT).

3. The pump drive according to claim 1, wherein the pump drive shaft is radially centered in the converter hub of the torque converter by way of a driving profile of the pump drive shaft.

4. The pump drive according to claim 1, wherein centering mechanisms (43) for the pump drive shaft are provided which, viewed spatially, are arranged on a side of the driving profile of the pump drive shaft facing toward the drive motor.

5. The pump drive according to claim 1, wherein the pump drive shaft (40) is statically sealed relative to the converter hub (12) by a sealing ring (42), the statically sealing ring (42), viewed in the radial direction, is arranged between the pump drive shaft (40) and the converter hub (12) and, viewed in the axial direction, is arranged adjacent the driving profile (41) of the pump drive shaft (40) on a side of the driving profile (41) remote from the drive motor (MOT).

6. The pump drive according to claim 1, wherein the pump drive shaft (40) is rotationally sealed by a sealing ring (44) relative to a housing hub (24) fixed on the transmission housing, which is connected positively to a guide wheel (14) of the torque converter (10), the rotationally sealing ring (44), viewed in the radial direction, is arranged between the pump drive shaft (40) and the housing hub (24) and, viewed in the axial direction, is arranged on a side of the pump drive shaft (40) remote from the drive motor (MOT).

7. The pump drive according to claim 1, wherein the converter hub (12) is rotationally sealed relative to the wall (21), the rotationally sealing ring (23), viewed in the radial direction, is arranged between the converter hub (12) and an inside diameter of a bore in the wall (21) fixed with respect to the transmission housing and, viewed in the axial direction, being arranged on a side of the converter hub bearing (22) facing the drive motor (MOT) and toward the driving profile (41) of the pump drive shaft (40).

8. The pump drive according to claim 1, wherein the oil pump (49) is arranged non-co-axially with the torque converter (10) and is connected to the pump wheel (11) of the torque converter (10) by way of one of a chain drive, a spur drive or a bevel drive, the pump drive shaft (40) is connected to one of a driven chain wheel (45) of the chain drive, a driven spur gear of the spur drive or a driven bevel gear of the bevel drive, and a follower chain wheel (47) of the chain drive is driven by one of a chain (46), a follower spur gear of the spur drive, or a follower bevel gear of the bevel drive, being connected to one of a pump input shaft (48) or a pump wheel of the oil pump (49).

9. The pump drive according to claim 8, wherein the pump drive shaft (40) and one of the driven chain wheel (45), the driven spur gear or the driven bevel gear are made integrally, as one piece.

10. The pump drive according to claim 1, wherein the oil pump is arranged co-axially with the torque converter, and the pump drive shaft is connected to a pump wheel of the oil pump.

11. The pump drive according to claim 10, wherein the pump drive shaft and the pump wheel of the oil pump are made integrally, as one piece.

12. A pump drive of an automatic transmission (1) with a hydrodynamic torque converter (10) driven by a drive motor (MOT), the pump drive comprising:
- a pump wheel (11) of the hydrodynamic torque converter (10) is fixed to a converter hub (12), which extends from the pump wheel (11) in a direction opposite the drive motor (MOT) and is rotatably supported by a hub bearing (22) co-axially with a transmission input shaft (30);
- a pump drive shaft (40) is co-axially aligned with and spans an interior portion of the converter hub (12) and engages the interior portion of the converter hub (12) such that the pump drive shaft (40) is rotatably driven by the converter hub (12);
- a chain wheel (45) is rotatably fixed to an end of the pump drive shaft (40);
- an oil pump (49) of the automatic transmission (1) has a pump input shaft (48) and is aligned such that the pump input shaft (48) is parallel with the co-axially aligned converter hub (12), the pump drive shaft (40) and the transmission input shaft (30); and
- a chain (46) engages both the chain wheel (45) and the pump input shaft (48) such that the oil pump (49) is driven by rotation of the pump drive shaft (40).

* * * * *